United States Patent [19]

Premji

[11] Patent Number: 5,383,710
[45] Date of Patent: Jan. 24, 1995

[54] MANUAL SEAT BACK LATCH FOR VEHICLES

[75] Inventor: Gulam Premji, Mississauga, Canada

[73] Assignee: Bertrand Faure Ltd., Mississauga, Canada

[21] Appl. No.: 13,364

[22] Filed: Feb. 4, 1993

[30] Foreign Application Priority Data

Oct. 16, 1992 [CA] Canada .................................. 2080758

[51] Int. Cl.$^6$ ............................................. B60N 2/20
[52] U.S. Cl. .................................. 297/378.12; 297/367
[58] Field of Search ............... 297/367, 366, 368, 369, 297/378.1, 378.12, 378.11; 74/409, 440

[56] References Cited

U.S. PATENT DOCUMENTS

| | | | |
|---|---|---|---|
| 4,607,884 | 8/1986 | Heling | 297/378.12 X |
| 4,634,182 | 1/1987 | Tanaka | 297/378.11 |
| 4,685,736 | 8/1987 | Tanaka et al. | 297/367 X |
| 4,872,726 | 10/1989 | White et al. | 297/367 |
| 4,875,735 | 10/1989 | Moyer et al. | 297/366 X |
| 5,156,439 | 10/1992 | Idlani et al. | 297/367 |

OTHER PUBLICATIONS

Fredrick T. Gutmann, "18 Ways to Control Backlash in Gearing", Product Engineering, Oct. 26, 1959, pp. 71–75.

*Primary Examiner*—Kenneth J. Dorner
*Assistant Examiner*—Milton Nelson, Jr.
*Attorney, Agent, or Firm*—Patrick J. Hofbauer

[57] ABSTRACT

A selectively latchable vehicle seat hinge assembly has a first hinge arm and a first hinge plate each pivotally mounted about a common pivot axis for relative pivotal movement with respect to each other in first and second angular directions. A stop mechanism is mounted on the first hinge plate in interfering relation with the first hinge arm so as to limit the relative pivotal movement of the first hinge arm and the first hinge plate in the first angular direction. A latch plate is mounted on the first hinge plate. A latch pawl is pivotally mounted on the first hinge arm by way of an eccentrically operative, rotatably adjustable, backlash reduction mechanism for pivotal movement about a separate pivot axis distinct from the common pivot axis and for selective latching contact with the latch plate, so as to limit the relative pivotal movement of the first hinge arm and the first hinge plate in the second angular direction. The backlash reduction mechanism is mounted on the first hinge arm for rotation about a first pivot axis off-set and distinct from the common pivot axis to an optimized position, at which optimized position the backlash reduction mechanism interacts with the latch pawl to move the separate pivot axis and the latch pawl generally toward the latch plate, thereby to cause controlled reduction in the amount of backlash between the latch pawl and the latch plate.

9 Claims, 6 Drawing Sheets

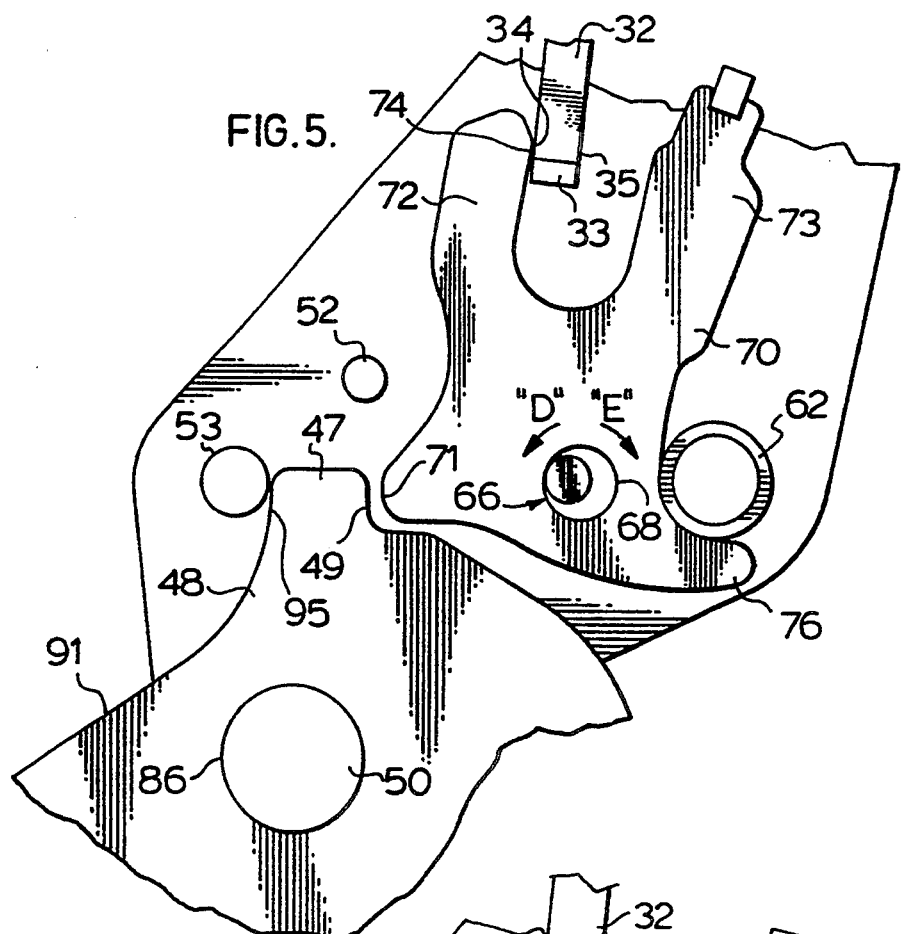
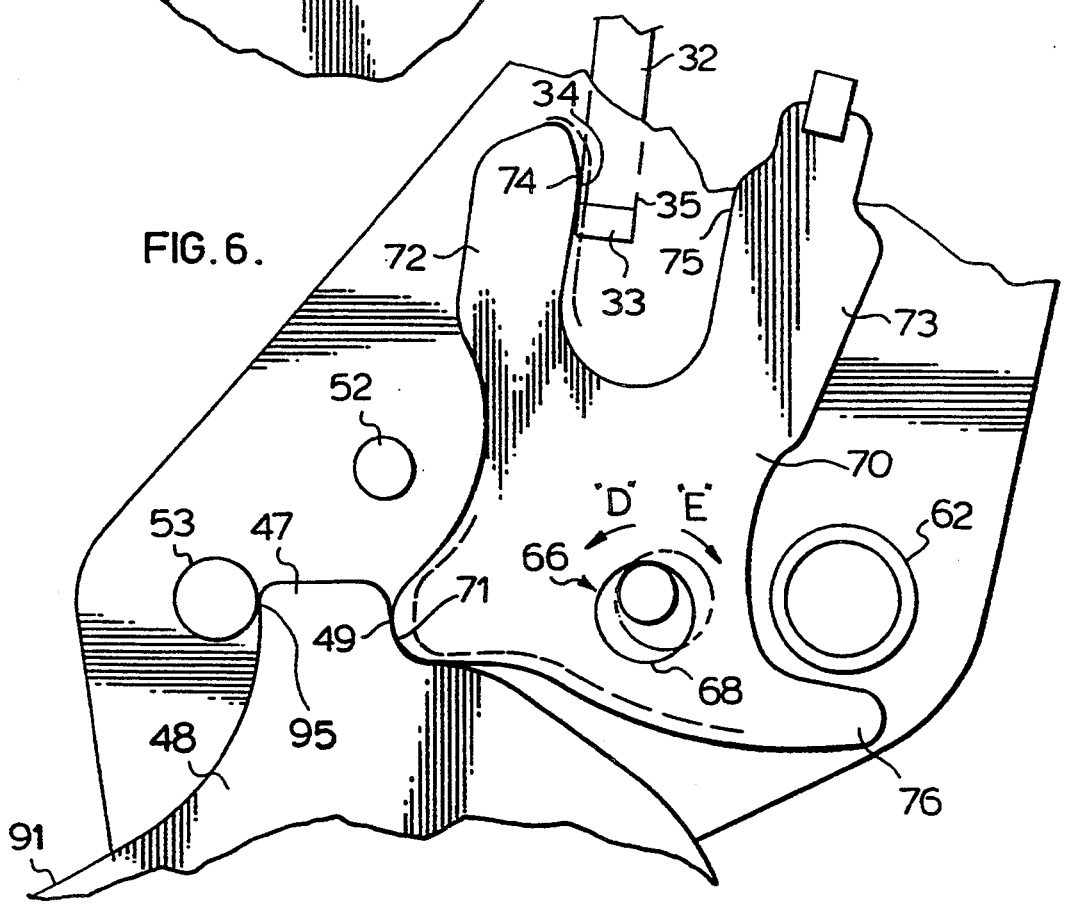

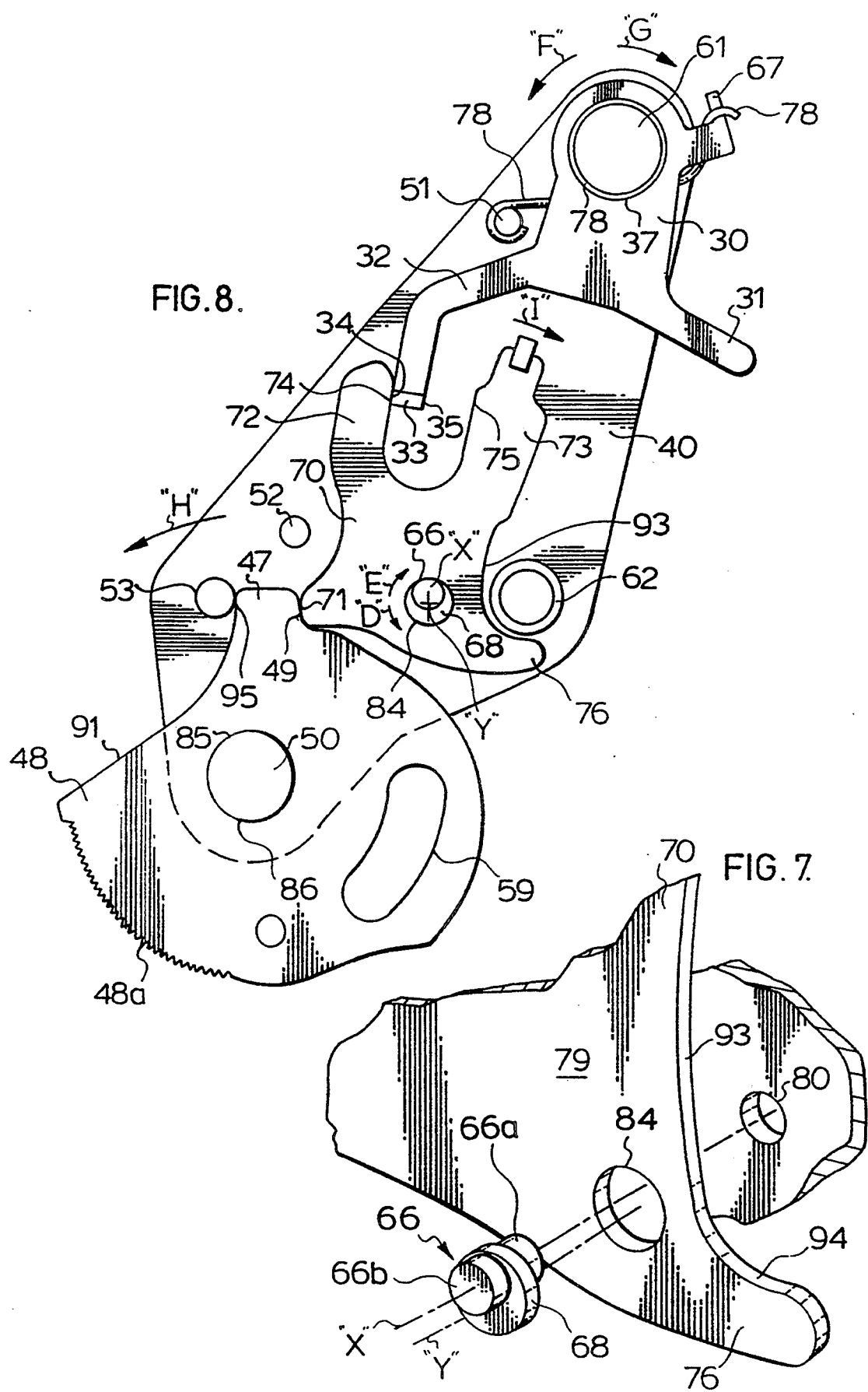

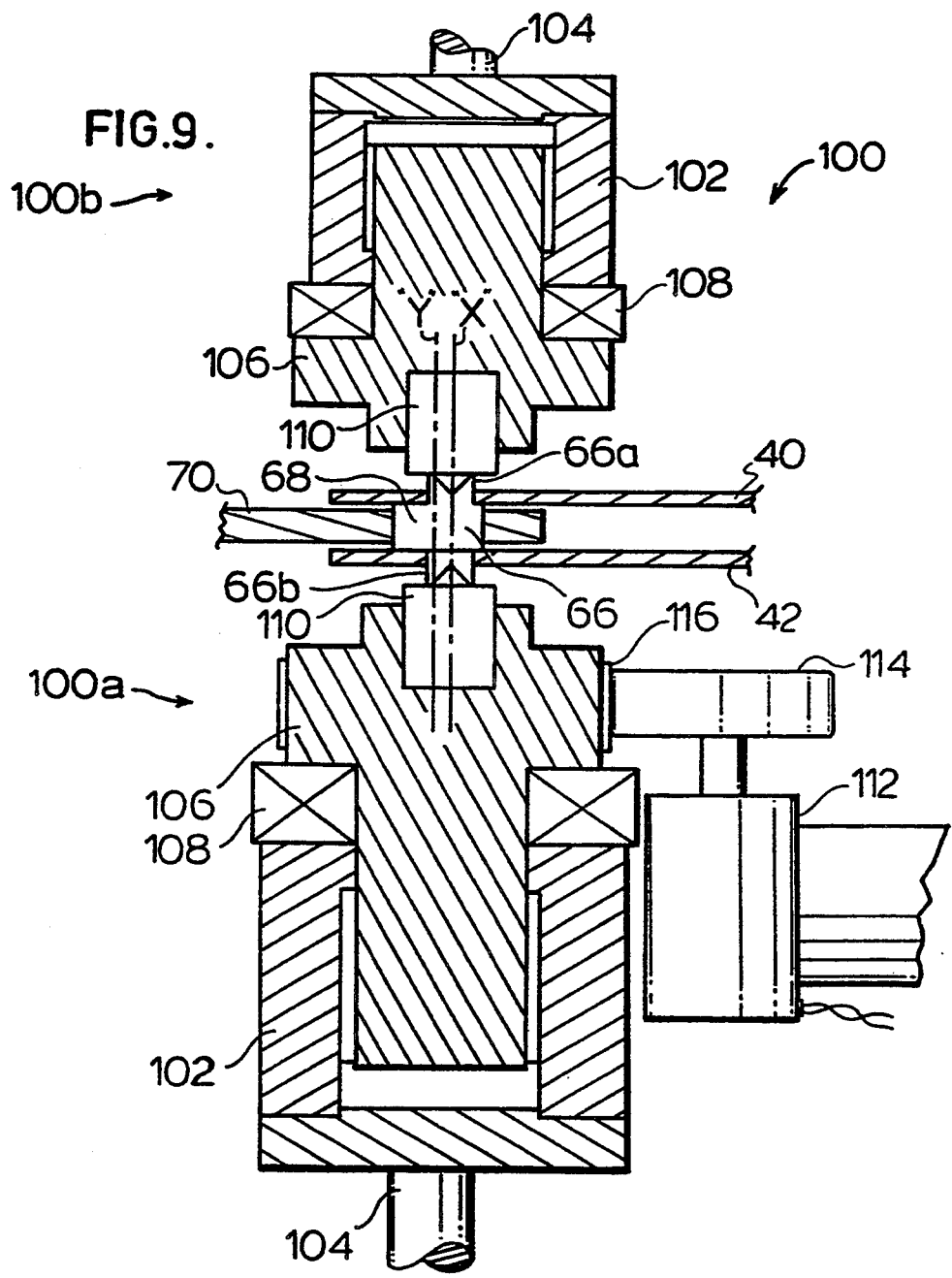

MANUAL SEAT BACK LATCH FOR VEHICLES

FIELD OF THE INVENTION

This invention relates to improvements in hinge assemblies for vehicle seats. Further, this invention relates to methods of reducing backlash in the production of such hinge assemblies.

BACKGROUND OF THE INVENTION

In a vehicle seat hinge assembly, it is common to have several components that comprise the hinge assembly, including the components that provide for the angle of the seat back, to be controllably adjustable. Most of these components are mass produced from sheet metal by stamping or similar processes. For any one particular component produced in this manner, a range of tolerances in the order of 0.010" can be expected. Resultingly, replications of the same component will be of slightly different sizes. When the vehicle seat hinge assembly is assembled, the various components are placed seriatim one to another and, resultingly, the aforesaid tolerances of the various components stack. Thus, the overall dimensions of the assembled vehicle seat hinge assembly may vary by up to about 0.030", or more.

The stacked tolerances of all of these components can vary considerably from one replication of a given hinge assembly to the next replication of the same type of hinge assembly.

When the various components of a seat hinge assembly are assembled, there is an inherent space, known as "clearance" between each component and any component mating therewith. Clearance is due to differences in size between the various mating components. Clearances between the mating components cause a condition known as backlash. Backlash results, for instance when one component is operatively moved and the clearance between any of the mating components is eliminated such that all of the components are contacting mating components so as to allow for concurrent movement of all of the mating components. Thus, a certain degree of backlash is a necessary characteristic of vehicle seat hinge assemblies and is needed to give the various components of any particular replication of the hinge assembly enough freedom to operatively move with respect to one another. However, excessive backlash, which may result from the stacked tolerances previously described, is undesirable from both the aesthetic and safety standpoints.

Backlash in a vehicle seat hinge assembly typically manifests itself by way of pivotal looseness of the seat back of a vehicle seat with respect to the seat cushion. In one well-known type of manually operable vehicle seat hinge assembly, the seat back is manually released with respect to the seat cushion through operation of a release lever which interacts with a latch pawl pivotally mounted on the seat back. Such a latch pawl is typically mounted on the seat back for selective latching contact with a latch plate associated with the seat cushion. With this arrangement, the seat back may be unlatched to fold forwardly over the seat cushion, which is commonly known in the art as "dumping" of the seat back. Backlash between the latch pawl and the latch plate in the latched configuration of the seat hinge assembly is a major contributor to the aforesaid pivotal looseness of the seat back.

For both aesthetic and safety reasons, the seat back must be held securely in place and relatively immovable with respect to the seat cushion when latched in its upright position. Accordingly, backlash between the seat back and the seat cushion should be minimized when the seat back is latched in its upright position.

The reduction of backlash in vehicle seat hinges has become one of the single most important problems to be overcome by vehicle seat hinge designers in the last decade. One solution widely employed by the industry has been to re-design existing vehicle seat hinges by employing optimized geometry. While such solutions have been partially successful, further improvements in backlash reduction remain necessary and desirable.

SUMMARY OF THE INVENTION

It is an object of the present invention to provide a manually releasable vehicle seat hinge assembly having a minimized amount of backlash in the release mechanism of the assembly.

It is another object of the present invention to provide a manually releasable vehicle seat hinge assembly that incorporates an eccentrically operative rotatably adjustable backlash reduction means to interact with a latch pawl of the release mechanism so as to cause controlled reduction in the amount of backlash between the latch pawl of the release mechanism and the latch plate thereof.

It is a further object of the present invention to provide a method of assembly of a manually releasable vehicle seat hinge assembly wherein, during assembly, an eccentrically operative rotatably adjustable backlash reduction means is rotated to an optimized position so as to cause controlled reduction in the amount of backlash between the latch pawl of the release mechanism and the latch plate thereof.

It is yet a further object of the present invention to provide a manually releasable vehicle seat hinge assembly having a minimized amount of backlash in the release mechanism, which hinge assembly provides minimal structural differences from pre-existing manually releasable vehicle seat assemblies, thereby reducing the complexity and cost of re-tooling for production thereof.

Other objects, features and characteristics of the present invention, as well as methods of operation and functions of the related elements of the structure, and the combination of parts and economies of manufacture, will become more apparent upon consideration of the following detailed description and the appended claims with reference to the accompanying drawings, all of which form a part of this specification.

There is thus provided, according to the invention, in a selectively latchable vehicle seat hinge assembly having a first hinge arm and a first hinge plate each pivotally mounted about a common pivot for relative pivotal movement with respect to each other in first and second angular directions, a latch plate operatively mounted on the first hinge plate, a latch pawl means pivotally mounted on the first hinge arm for selective latching contact with the latch plate so as to preclude relative pivotal movement of the first hinge arm and the first hinge plate in a second rotational direction, and operating means interfacing with the latch pawl means so as to provide for said selective latching contact, the improvement comprising:

pivotally mounting the latch pawl means on the first hinge arm by means of an eccentrically operative rotatably adjustable backlash reduction means rotatably mounted on the first hinge arm about a first pivot axis, the eccentrically operative rotatably adjustable backlash reduction means being rotatable about the first pivot axis to an optimized position during assembly of the vehicle seat hinge assembly, thereby to interact with the latch pawl means, such that the latch pawl means is operatively moved toward the latch plate so as to cause controlled reduction in the amount of backlash between the latch pawl means and the latch plate.

There is also disclosed according to the invention a method of assembling a selectively latchable vehicle seat hinge assembly having a first hinge arm and a first hinge plate each pivotally mounted about a common pivot for relative pivotal movement with respect to each other in first and second angular directions, a latch plate operatively mounted on the first hinge plate, a latch pawl means pivotally mounted on said first hinge arm for selective latching contact with said latch plate so as to preclude relative pivotal movement of said first hinge arm and said first hinge plate in a second rotational direction, and operating means interfacing with said latch pawl means so as to provide for said selective latching contact. The method comprises the steps of:
 a) assembling a first sub-assembly by:
  i) mounting said eccentrically operative rotatably adjustable backlash reduction means on said first hinge arm in rotatable relation thereto;
  ii) pivotally mounting said latch pawl means on said eccentrically operative rotatably adjustable backlash reduction means;
  iii) mounting said operating means on the first hinge arm in operative relation to said latch pawl means;
 b) assembling a second sub-assembly by:
  i) operatively mounting said latch plate on said first hinge plate;
 c) positioning said first and second sub-assemblies in partially overlapped operative relation to one another and thereafter inserting the common pivot through aligned receiving apertures positioned in each of the overlapped portions of the first hinge arm and the first hinge plate;
 d) fastening the common pivot such that it is retained in said apertures;
 f) rotationally adjusting the eccentrically operative rotatably adjustable backlash reduction means to an optimized position so as to interact with said latch pawl means such that said latch pawl means is operatively moved toward said latch plate, thereby to cause controlled reduction in the amount of backlash between said latch pawl means and said latch plate;
 g) fastening said eccentrically operative rotatably adjustable backlash reduction means to said first hinge arm such that said optimized position is retained.

DETAILED DESCRIPTION OF A PREFERRED EMBODIMENT

Introduction to the Drawings

FIG. 5 is an enlarged side elevational view of the vehicle seat hinge assembly of FIG. 3 in a latched position, with parts omitted for clarity, and showing the inherent backlash between the latch pawl and latch plate prior to adjustment of the eccentrically operative rotatably adjustable backlash reduction means so as to cause controlled reduction in such backlash;

Figure 3:
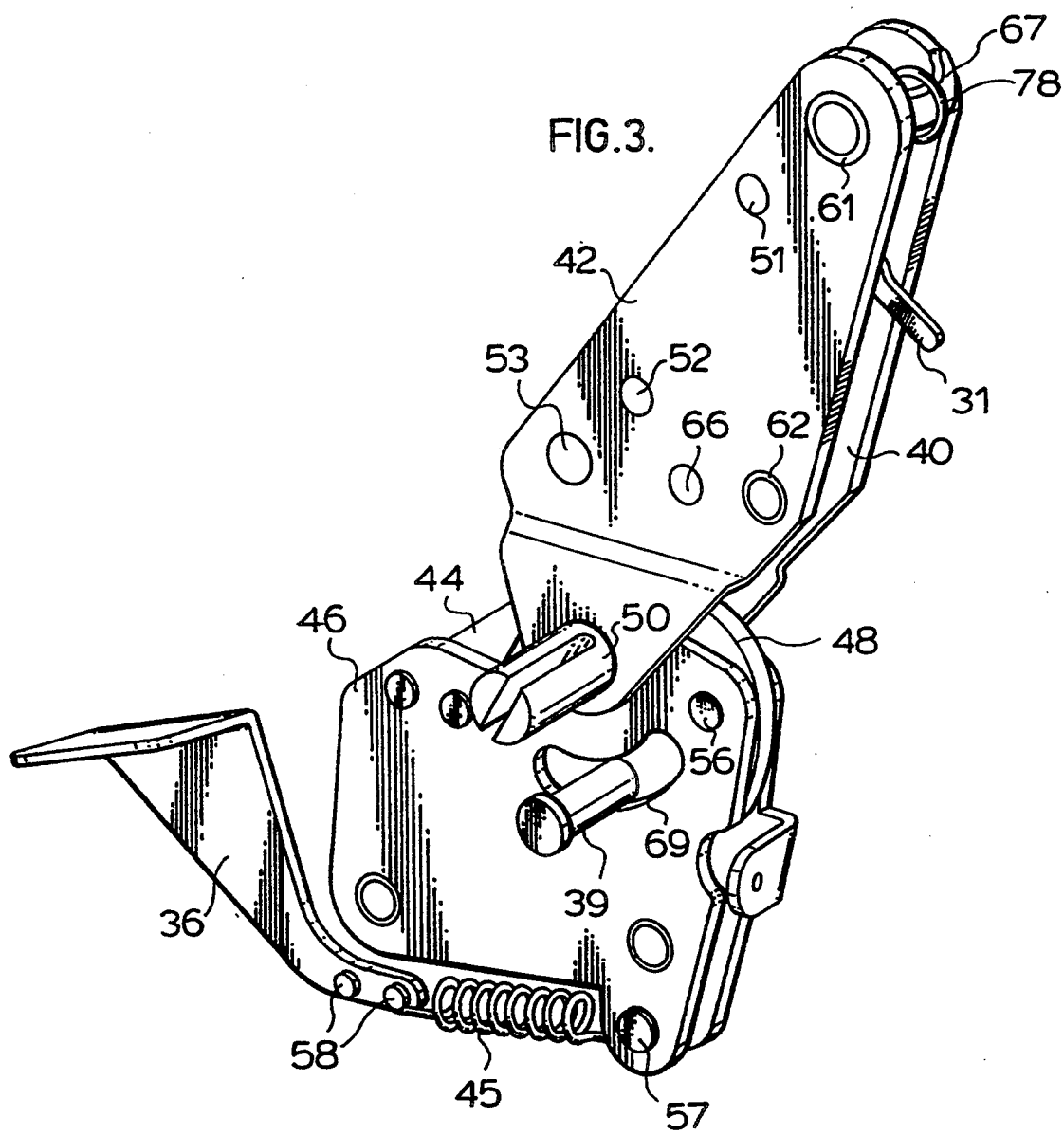
FIG. 3 is a perspective view from the left rear of the hinge assembly of FIG. 1, with the protective trim covers removed for the ease of illustration.
Figure 4:
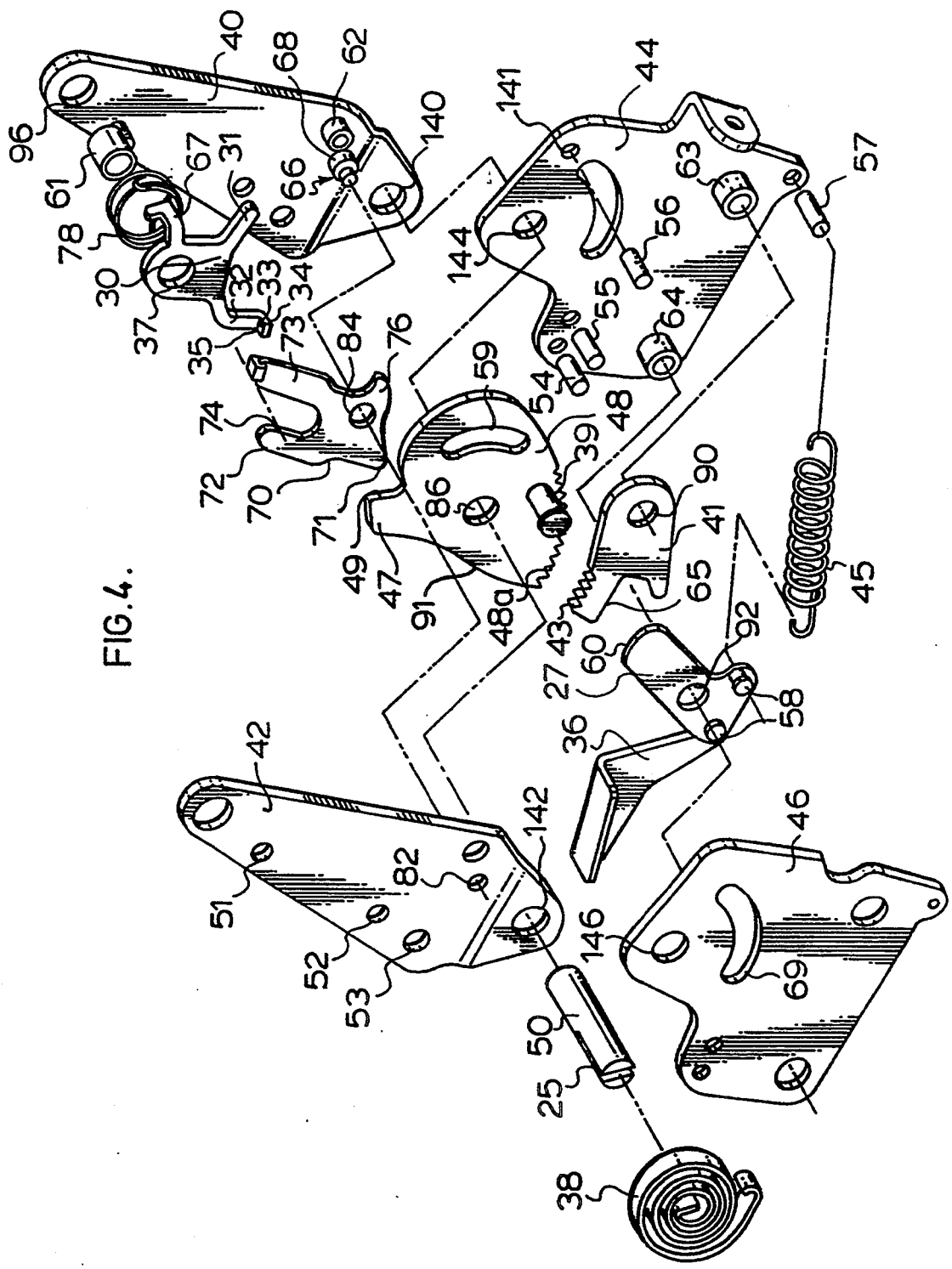
FIG. 4 is an exploded isometric view of the improved vehicle seat hinge assembly of FIG. 1.

FIG. 6 is an enlarged elevational side view of the vehicle seat hinge assembly of FIG. 3 showing, in phantom outline, the latch pawl and the eccentrically operative rotatably adjustable backlash reduction means in their FIG. 5 positions, and showing, in solid outline, the eccentrically operative rotatably adjustable backlash reduction means rotated to an optimized position so as to reduce the inherent backlash between the latch pawl and the latch plate;

FIG. 7 is an enlarged exploded isometric view of a portion of the vehicle seat hinge assembly of FIG. 3;

FIG. 8 is a partial side elevational view of the improved vehicle seat hinge assembly of FIG. 3 shown fully assembled in a latched configuration, with parts omitted for clarity; and, FIG. 9 is a partial section view of the vehicle seat hinge assembly of FIG. 4 positioned within a jig mechanism adapted to rotationally adjust a portion of the release mechanism to an optimized position during assembly according to the method of the invention.

Figure 1:
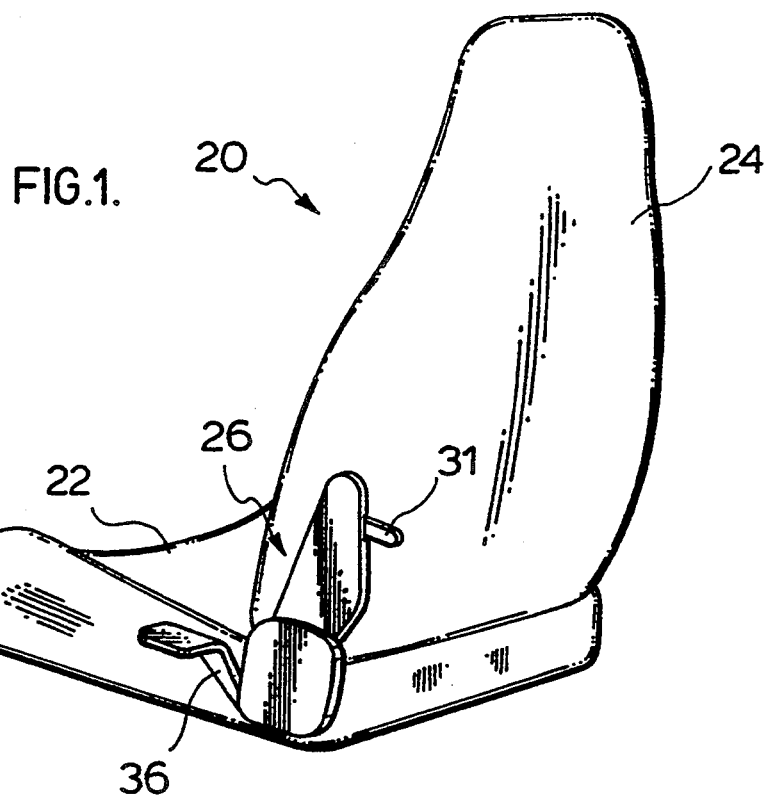
FIG. 1 is a perspective view from the left rear of a vehicle seat having an improved hinge assembly according to the present invention mounted thereon.
Figure 2:
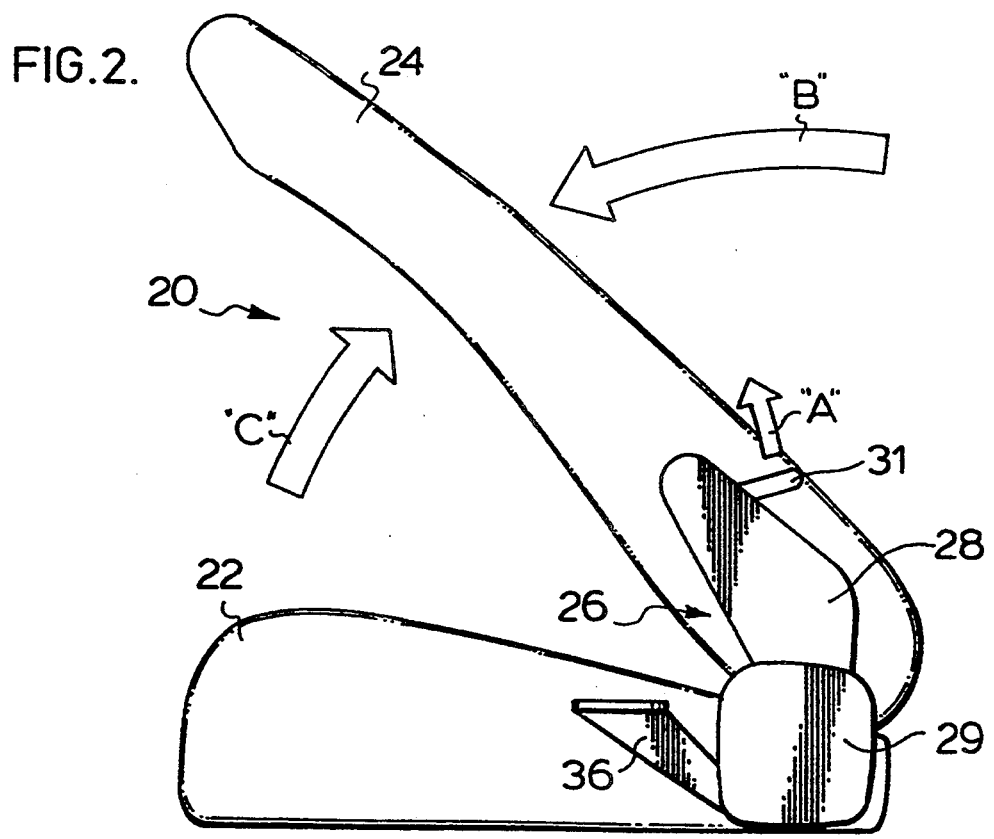
FIG. 2 is a side elevational view of the vehicle seat of FIG. 1 in a partially forwardly folded or "dumped" configuration.

FIGS. 1 and 2 show a conventional vehicle seat 20 essentially comprising a seat cushion 22 and a seat back 24 with a selectively latchable vehicle seat hinge assembly, designated by the general reference numeral 26, connecting the seat cushion 22 and the seat back 24 in foldable relation to one another. The vehicle seat hinge assembly 26 is covered by protective plastic trim covers 28 and 29, which have been removed in the remaining Figures for ease of illustration. These trim covers 28 and 29 are clipped onto the hinge assembly 26 in a conventional manner. A manually operable lever means 30, which has an exposed handle portion 31, is used to selectively latch and unlatch the vehicle seat hinge assembly 26. The handle portion 31 extends rearwardly from the vehicle seat hinge assembly 26 and is manually operable in an upward direction as indicated by arrow "A" in FIG. 2. When the handle portion 31 of the manually operable lever means 30 is lifted in the direction of arrow "A" the vehicle seat hinge assembly 26 is caused to be unlatched, thereby allowing the seat back 24 to be "dumped" in a first angular direction with respect to the seat cushion 22, as indicated by arrow "B". The seat back 24 is returned to its upright position by way of movement in second angular direction with respect to seat cushion 22, as indicated by the arrow "C".

Another manually operable lever means 36, which is pivotally mounted at the bottom area of the vehicle seat hinge assembly 26 and extends forwardly and upwardly therefrom, is used to selectively latch and unlatch the vehicle seat hinge assembly 26 for incremental reclining adjustment of the seat back 24. The means by which this latching and unlatching is accomplished will be discussed subsequently.

A conventional vehicle seat hinge assembly (not shown) is similarly positioned on the opposite other lateral side of the vehicle seat 20 for coordinated pivotal folding of the seat back 24. Its construction, placement and manner of operation are well known to those skilled in the art, so that a further description thereof is not necessary in order to gain a full understanding of the present invention.

Reference will now be made to FIG. 3–8, in order to fully describe a preferred embodiment of improved vehicle seat hinge assembly 26 according to the present invention.

The vehicle seat hinge assembly 26 preferably comprises a first hinge arm 40 and a second hinge arm 42, which are spaced apart from each other in generally parallel relation and are secured to each other by first spacer 61 and second spacer 62, and by first 51, second 52, and third 53 rivetable pins. The first 51, second 52, and third 53 rivetable pins are secured by any suitable well known securing operation such as stamping. The first hinge arm 40 and the second hinge arm 42 are pivotally mounted about a common pivot, exemplified by common pivot pin 50, which is similarly secured in place by any well known securing operation, such as stamping.

The vehicle seat hinge assembly 26 also preferably comprises a first hinge plate 44 and a second hinge plate 46 pivotally mounted about the common pivot pin 50 in parallel relation to each other. Mounted on the first hinge plate 44 and the second hinge plate 46 in interposed relation thereto is a latch plate 48, which is also pivotally mounted about the common pivot pin 50. Such pivotal mounting allows for selective angular displacement of the latch plate 48 with respect to the first 44 and second 46 hinge plates. The latch plate 48, the first 44 and second 46 hinge plates together form an articulated hinge plate structure. The angular displacement of the latch plate 48 with respect to the first hinge plate 44 and the second hinge plate 46 is controlled by a toothed latch member 41 having teeth 43, which intermesh with the teeth 48a of the latch plate 48. The toothed latch member 41 is biased toward the latch plate 48 by urging contact of a cam surface 60 of a cam member 27, which is a separate portion of the manually operable lever means 36. The cam member 27 is held fast to the manually operable lever means 36 by rivetable fasteners 58. The cam surface 60 acts on the cam follower surface 65 on the toothed latch member 41. A coil spring 45 is interconnected between a seventh rivetable pin 57 and one of the rivetable fasteners 58 to bias the cam member 27 into urging contact with the cam follower surface 71 as to in turn bias the toothed latch member 41 into latching engagement with the latch plate 48. The manually operable lever means 36 and the toothed latch member 41 are thus used to selectively latch and unlatch said latch plate 48 in angular relation with respect to the first 44 and second 46 hinge plates. The use of such an arrangement of components to allow the inclination angle of the seat back 24 of the vehicle seat to be adjusted in a reclining manner is well known in the art, and a further description thereof is not necessary to gain a full understanding of the present invention. Alternatively, the latch plate 48 may be integral with one or both of the first 44 and second 46 hinge plates. In either instance, the latch plate 48 can be said to be "operatively mounted" on the first hinge plate 44, as that term is used in the appended claims.

Interposed between the first hinge arm 40 and the second hinge arm 42 is a latch pawl means 70 that is pivotally mounted on an eccentrically operative rotatably adjustable backlash reduction means 66. The eccentrically operative rotatably adjustable backlash means 66 is preferably a pin which has a centrally located first pivot axis "X", (see FIG. 8), and an eccentrically displaced hub 68. The hub 68 has a located second pivot axis "Y". The first 66a and second 66b concentric end shaft portions of the eccentrically operative rotatably adjustable backlash reduction means 66 are rotatably retained within the first hinge arm 40 and the second hinge arm 42, respectively, in a first 80 and second 82 circular openings. The eccentrically displaced hub 68 of the eccentrically operative rotatably adjustable backlash reduction means 66 is received in a circular opening 84 in the latch pawl means 70. The latch pawl means 70 is thereby mounted on the eccentrically operative rotatably adjustable backlash reduction means 66 for pivotal movement therearound.

The latch pawl means 70 has a main body portion 79 in which the circular opening 84 is formed, with a first vertical arm 72 and a second vertical arm 73 extending from the main body portion 79. The first vertical arm 72 is for interfacing with the manually operable lever means 30, which will be described subsequently in more detail, and which is referred to generally in the claims appended hereto as the "operating means", for interfacing with the latch pawl means 70.

The pivotal movement of the latch pawl means 70 is ultimately limited in a first rotational direction, as indicated by arrow "D", by second spacer 62, and is ultimately limited in a second rotational direction, as indicated by arrow "E", by second rivetable pin 52, at least where the latch plate 48 is not otherwise engaged by the latch pawl 70 as more fully described herein.

The latch pawl means 70 has a latched configuration as shown in FIGS. 5, 6 and 8. In the latched configuration, the latch pawl means 70 latchingly contacts the latch plate 48 so as to preclude rotational movement of the hinge arms 40, 42 with respect to the latch plate 48 (and also with respect to the hinge plates 44, 46,) in the first angular direction as indicated by arrow "B" of FIG. 2, thereby precluding corresponding rotational movement of the seat back 24 with respect to the seat cushion 22.

The latch pawl means 70 has an initial position upon assembly, which is shown in solid lining in FIG. 5, and in partial ghost outline in FIG. 6, wherein a cam follower surface 71 on the latch pawl means 70 is juxtaposed to, but may not actually be in contact with, a cam surface 49 on the latch plate 48. There is, as discussed previously, an inherent backlash between the latch pawl means 70 and the latch plate 48. Such backlash is typically manifested upon initial assembly of the vehicle seat hinge assembly 26. As discussed previously, this backlash is undesirable and the present invention reduces this backlash by way of rotatable adjustment of the eccentrically operative rotatably adjustable backlash reduction means 66.

After initial assembly of the various components of the vehicle seat hinge assembly 26, the eccentrically operative rotatably adjustable backlash reduction means 66, which is still loosely mounted in the circular opening 80 and 82, is rotatably adjusted to an optimized position so as to reduce the inherent backlash between the latch pawl means 70 and the latch plate 48, thereafter taking up the position shown in solid outline in FIG.

6. The first 66a and second 66b concentric end shaft portions are then secured in this optimized position to the first 40 and second 42 hinge arms by riveting or other conventional fastening techniques.

Also disposed between the first hinge arm 40 and the second hinge arm 42 is the manually operable lever means 30, which is separately mounted on the first 40 and second 42 hinge arms by way of the first spacer 61 for pivotal movement therearound. The manually operable lever means 30 comprises the handle portion 31 for grasping by an operator, an extension arm 32 that extends toward the latch pawl means 70 and terminates in a transverse tab portion 33 that is disposed between the first vertical arm 72 and a second vertical arm 73 of the latch pawl means 70. A first contacting surface 34 on the extension arm 32 in the area of the transverse tab portion 33 contacts a corresponding first receiving surface 74 on the first vertical arm 72 upon pivotal rotation of the manually operable lever means 30.

In use, the handle portion 31 of the manually operable lever means 30 is lifted so as to cause the manually operated lever means 30 to rotate about the first spacer 61 in a first counter-clockwise rotational direction, as indicated by arrow "F" (see FIG. 8). Correspondingly, the extension arm 32 moves from contacting a first receiving surface 74 of the first vertical arm 72 toward the second vertical arm 73, so that a second contacting surface 35 of the extension arm 32 contacts the second receiving surface 75 of the second vertical arm 73. Continued lifting of the handle portion 31 upon simultaneous pushing forward of the seat back 24 causes continued rotation of the extension arm 32, which in turn causes the latch pawl means 70 to rotate in a second direction about the eccentrically operative rotatably adjustable backlash means 66 (which has been fastened in its optimized position as aforesaid), as indicated by arrow "I" of FIG. 8. This action causes the cam follower surface 71 of the latch pawl means 70 to move upwardly over the cam surface 49 of the latch plate 48 so that the cam follower surface 71 clears the cam surface 49. Once the cam follower surface 71 clears the cam surface 49, which is the unlatched configuration of the latch pawl means 70, the latch pawl means 70 is free to move past the latch plate 48 in a direction as indicated by arrow "H", so as to allow "dumping" of the seat back 24 over the seat cushion 22.

Rotation of the manually operable lever means 30 is limited in the first direction of arrow "F" by contact of trailing edge 93 of the pawl means 70 against the second spacer 62. Similarly, rotation of the manually operable lever means 30 is limited in the second rotational direction of arrow "G" by contact of the upper edge 94 of turkey spur portion 76 of the latch pawl means 70 against the second spacer 62. A torsion spring 78 wound about the first spacer 61 (see FIG. 4) engages both the first hinge arm (through engagement with the first rivetable pin 51) and the manually operable lever means 30 (through engagement with hook portion 67) to bias the lever means 30 in the second rotational direction arrow "G" of FIG. 8, so as to thereby bias latch pawl means 70 against the latch plate 48 in the manner previously described.

Once the cam follower surface 71 clears the cam surface 49, dumping of the seat back 24 with respect to the seat cushion 22 in the first angular direction, (arrow "B" of FIG. 2) is preferably limited by contact of a third rivetable pin 53 on a ramped leading edge 91 of the latch plate 48. Similarly, in order to limit angular movement of the seat back 24 with respect to the seat cushion 22 in the second angular direction (arrow "C" of FIG. 2), the third rivetable pin 53 which acts a stop means contacts a front face 95 of the head portion 47 of the latch plate 48.

As discussed previously, the manufacturing tolerances of the various components in the vehicle seat hinge assembly 26 can vary considerably from one replication of a given vehicle seat hinge assembly 26 to another replication of the same type of hinge assembly. Further, given that these components contact one another and the movement and displacement of one relies on the position of another, the tolerances become stacked. The stacking of such tolerances can cause less than desirable positioning of the cam follower surface 71 with respect to the cam surface 49. Ideally, the cam follower surface 71 should gently contact the cam surface 49 in the latched configuration so that there is no looseness between the latch pawl means 70 and the latch plate 48. Looseness between the cam follower surface 71 and the cam surface 49 causes backlash between the latch pawl means 70 and the latch plate 48, which translates to potential shaking or vibrating of the seat back 24, in its upright orientation. If the cam follower surface 71 contacts the cam surface 49 too tightly, unlatching may be difficult or unreliable, as jamming may occur.

In order to ensure that the cam follower surface 71 contacts the cam surface 49 in a reasonably predictable nature in terms of location and force acting between the two opposed surfaces 49, 71, the position of the latch pawl means 70 can be adjusted as previously described by way of rotatably adjusting the eccentrically operative rotatably adjustable backlash reduction means 66 to an optimized position. This optimized rotational adjustment is preferably achieved after initial assembly by rotating the eccentrically operative rotatably adjustable backlash reduction means 66 about its first pivot axis "X" (see FIG. 8). When the eccentrically operative rotatably adjustable backlash reduction means 66 is rotated about its first pivot axis "X", the second pivot axis "Y" is simultaneously displaced laterally to a new position. Such lateral displacement of the second pivot axis "Y" causes the eccentrically displaced hub 68 to interact with the latch pawl means 70, thereby to cause controlled reduction in the amount of backlash between the latch pawl means 70 and the latch plate 48.

Resulting from such optimized rotation of the eccentrically operative rotatably adjustable backlash reduction means 66, the cam follower surface 71 is placed in contact against the cam surface 49 of the latch plate 48 at a predictable location and with a predictable force acting between the two surfaces 49, 71. The backlash between the latch pawl means 70 and the latch plate 48 is thereby reduced to a minimized amount, or preferably virtually eliminated. Resultingly, the vehicle seat hinge assembly 26 does not exhibit characteristics of looseness that might otherwise be manifested in terms of shaking or vibrating, of the seat back 24.

A preferred method of assembling the vehicle seat hinge assembly 26 so as to have the eccentrically operative rotatably adjustable backlash reduction means 66 rotated to an optimized position as described above, will now be described in detail with particular reference to FIGS. 4 and 9, and comprises the following steps.

A first sub-assembly is assembled in the following manner. The first hinge arm 40 is placed in a known assembly jig and securely retained therein such that the manually operable lever means 30 and the latch pawl means 70 may be pivotably operatively mounted thereon and the various connecting members may also be mounted thereon. The first 51, second 52 and third 53 rivetable pins and the second spacers 62, all of which comprise "connecting members", as used in the claims appended hereto, are operatively positioned on the first hinge arm 40 at the appropriate openings. The torsion spring 78 is placed over the first spacer 61, which is in turn operatively mounted at the receiving aperture 96. The manually operable lever means 30 is then mounted on the first hinge arm 40 in operative relation thereto, such that the first spacer 61 is received within the central opening 37 for rotation of the manually lever means 30 around the first spacer 61. The torsion spring 78 is operatively connected to the first hinge arm 40 at the first rivetable pin 51 and to the manually operable lever means 30 at a hook portion 67, so as to bias the lever means 30 in the second rotational direction, as indicated by arrow "G". The eccentrically operative rotatably adjustable backlash reduction means 66 is then operatively mounted on the first hinge arm 40 in rotatable relation thereto such that the first end shaft portion 66a is received in the first circular opening 80. The latch pawl means 70 is then pivotally mounted on the first hinge arm 40 such that the eccentrically displaced hub 68 of the eccentrically operative rotatably adjustable backlash reduction means 66 is received in the circular opening 84 of the latch pawl means 70, so as to permit the latch pawl means 70 to pivot therearound. The extension arm 32 of the manually operable lever means 30 is located between the first vertical arm 72 and the second vertical arm 73 of the latch pawl means 70. The second hinge arm 42 is introduced to the first sub-assembly such that all of the connecting members are operatively mounted thereon. The connecting members are then fastened to the first 40 and second 42 hinge arms by a known fastening means such as riveting, such that the first and second hinge arms are connected to each other in spaced apart generally parallel relation. The order of the above sub-steps is not critical, and may be interchanged as desired and as will be apparent to those skilled in the art.

A second sub-assembly is preferably next assembled in the following manner. The first hinge plate 44 is placed in a known assembly jig and securely retained therein such that the latch plate 48, the toothed latch member 41 and the manually operable lever means 36 may be pivotally operatively mounted thereon and the various connecting members may also be mounted thereon. The fourth 54, fifth 55, sixth 56, and seventh 57 rivetable pins and the third 63 and fourth 64 spacers, all of which comprise "connecting members", are operatively positioned on the first hinge plate 44 at the appropriate openings. The latch plate 48 is then placed on the first hinge plate 44 such that the curved slot 59 therein receives a sixth rivetable pin 56 inserted in opening 141 on the first hinge plate 44, and the aperture 86 is aligned with the aperture 144 in the first hinge plate 44. The toothed latch member 41 is then mounted such that the circular opening 90 therein receives the third spacer 63 for rotation therearound. The teeth 43 of the toothed latch member 41 are positioned to engage the teeth 48a of the latch plate 48. The manually operable lever means 36, which has already been fastened to the cam member 27 by rivetable fasteners 58, is then mounted such that the circular opening 92 is received by the fourth spacer 64 in pivotal relation therearound. The cam surface 60 on the cam member 27 is positioned to contact the cam follower surface 65 on the toothed latch member 41. The second hinge plate 46 is then introduced to the second sub-assembly such that all of the connecting members described are operatively mated therewith. The connecting members are then fastened to the first 44 and second 46 hinge plates by a known fastening means, such as stamping, such that the first 44 and second 46 hinge plates are rigidly connected to each other in spaced apart generally parallel relation. The pin 39 that extends outwardly from the latch plate 48 and is received in a curved slot 69 in the second hinge plate 46. It can be seen that the range of angular adjustment of the latch plate 48 with respect to the first 44 and second 46 hinge plates is limited by the amount of travel of the pin 39 in the curved slot 69, and by the amount of travel of the sixth rivetable pin 56 in the curved slot 59. Again, the order of the steps of the second sub-assembly are not critical and can be varied as will be apparent to those skilled in the art.

The first and second sub-assemblies are assembled together into a final assembly in the following general manner. The first and second sub-assemblies are positioned in partially overlapped operative relation one to another (as seen in FIG. 9) with the respective receiving apertures 86, 140, 142, 144 and 146 in each of the overlapped portions of the first 40 and second 42 hinge arms and the first 44 and second 46 hinge plates respectively, being aligned with one another. The common pivot pin 50 is inserted through the aligned receiving apertures 86, 140, 142, 144 and 146. The common pivot pin 50 is then fastened by conventional riveting techniques, such as orbital staking or ring staking, such that the common pivot pin is retained in the receiving apertures 86, 140, 142, 144, and 146. Other conventional fastening means such as an "E" clip may be used in a manner well known in the art to fasten the common pivot pin 50 in place.

The first sub-assembly and the second sub assembly are thus retained on the common pivot pin 50 in pivotal relation to one another, so as to ultimately allow the seat back 24 to be pivotally moveable over the seat cushion 22.

A head portion 47 of the latch plate 48 is positioned between the third rivetable pin 53 and the cam follower surface 71 of the latch pawl means 70. This causes the cam surface 49 of the latch plate 48 to be juxtaposed to the cam follower surface 71 of the latch pawl means 70. This juxtaposed positioning of the cam follower surface 71 and the latch pawl means 70 is then preferably verified, by visual inspection, by, for example, the assembly line operator, or alternatively through the use of conventional electronic pattern matching means. It is possible, and indeed preferable, to perform this verification step before the common pivot pin 50 is fastened in interconnecting the two sub-assemblies with the aid of a viewing port (not shown) present in either or both of the first and second hinge arms 40, 42.

It may be desirable to use a tool pin (not shown) to assist in retaining the cam surface 49 and the cam follower surface 71 in juxtaposed operative relation during assembly, so as to ensure that the cam follower surface does not ride up on top of the head portion 47 of the latch plate 48 prior to rotation of the eccentrically operative rotatably adjustable backlash reduction means 66. The tool pin can be inserted and withdrawn after assembling through an appropriate port (not shown) in the first hinge plate 44.

According to the method, the eccentrically operative rotatably adjustable backlash reduction means 66 is then rotationally adjusted to an optimized position so as to interact with the latch pawl means 70 such that the latch pawl means 70 is operatively moved toward the latch plate 48, thereby to cause controlled reduction in the amount of backlash between the pawl means 70 and the latch plate 48. The eccentrically operative rotatably adjustable backlash reduction means 66 is preferably rotatably adjusted until a pre-designated torque value is reached, thereby defining the optimized position. A pre-designated torque value of about 10 foot pounds is preferred.

The eccentrically operative rotatably adjustable backlash reduction means is next fastened to the first 40 and second 42 hinge arms, such that the optimized positioned is retained. Preferably, the eccentrically operative rotatably adjustable backlash reduction means is fastened by a well known means such as riveting.

It is not imperative that the various parts as described above be mounted in the order described, so long as operative interaction between the parts, as required, is obtained.

A presently preferred manner in which the eccentrically operative rotatably adjustable backlash reduction means 66 may be rotatably adjusted to the optimized position will now be described with particular reference to FIG. 9. The vehicle seat hinge assembly 26 comprised of the two sub-assemblies previously described is placed into a rotating die mechanism designated by the general reference numeral 100, which die mechanism comprises two similar halves 100a and 100b, as shown in FIG. 9. Each half 100a, 100b of the rotating die mechanism 100 comprises an outer die housing 102 that is rigidly attached to a press shaft 104, which is operatively connected to a hydraulic press, and further receives a rotatable inner die member 106 therein. Each rotatable inner die member 106 is rotatably mounted with respect to the outer die housing 102 by a bearing 108 that is operatively attached to the outer die housing 102. Removably seated in each rotatable inner die member 106 is a spindle 110, each of which rotates with its respective rotatable inner die member 106.

The vehicle seat hinge assembly 26, assembled as described above, is held between the two halves 100a and 100b of the rotating die mechanism 100, with the eccentrically operative rotatably adjustable backlash reduction means 66 being retained in operatively tight relation between the two opposed spindles 110. The lower rotatable inner die member 106 is selectively driven by an electric motor 112 by way of a frictionally engaging flywheel 114, which flywheel engages a frictional enhancement surface 116 positioned around the outer circumference of the inner die member 106.

The eccentrically operative rotatably adjustable backlash reduction means 66 is rotationally adjusted to an optimized position as previously described by rotation of the rotatable inner die members 106 and the spindles 110. As the eccentrically operative rotatably adjustable backlash reduction means 66 is rotated about its first pivot axis "X", the second pivot axis "Y" is moved in a direction substantially perpendicular to the second pivot axis "Y", as the eccentrically displaced hub 68 is eccentrically located on the eccentrically operative rotatably adjustable backlash reduction means 66. Correspondingly, the latch pawl means 70 is operatively moved toward the latch plate 48, thereby to cause controlled reduction in the amount of backlash between the latch pawl means 70 and the latch plate 48. The optimized position is realized when the second pivot axis "Y" has been translated to a position such that the cam follower surface 71 is in a predetermined position with respect to the cam surface 49 and also exerts a predetermined force thereon. Preferably, the eccentrically operative rotatably adjustable backlash reduction means 66 is rotated until a predesignated torque value is reached, with this predesignated torque value preferably being about 10 ft. lbs.

Once the optimum rotational position of the eccentrically operative rotatably adjustable backlash reduction means 66 is achieved, the eccentrically operative rotatably adjustable backlash reduction means 66 is securely fastened in place, by riveting the two outer ends 66a, 66b through application of sufficient force through the spindles 110, 110 acted upon by a hydraulic press (not shown) operatively connected to the press shafts 104, 104. Fastening of the eccentrically operative rotatably adjustable backlash reduction means 66 allows the optimized position achieved by the aforedescribed rotation to be retained.

The coil spring 45 is then mounted between the hinge plates 44, 46 and the cam member 27, as previously described.

A return spring 38 is then mounted between the pin 39 on the latch plate 48 and a radial mounting slot 25 on the common pivot pin 50, so as to bias the latch plate 48 to a generally upright design orientation.

Other embodiments of the present invention also fall within the scope and spirit of the claims presented herein. In one such alternative embodiment (not illustrated), it is contemplated that the latch plate 48 be non-adjustable with respect to the first hinge plate 44, and is rather an integral part of the hinge plate 44. As such, the latch plate 48 is still "operatively mounted" on the latch plate, as that term is used in the claims.

In another alternative embodiment (not illustrated), it is contemplated that the manually operated lever is an integral part of the latch pawl means.

In yet a further alternative embodiment (not illustrated), it is contemplated that the latch pawl means is rotatably mounted on the first hinge arm about a stationary pivot axis independent stationary of the eccentrically operative rotatably adjustable backlash reduction means. When the eccentrically operative rotatably adjustable backlash reduction means is rotated, it interacts with the latch pawl means such that the position of the latch pawl means is moved rotatably about the independent stationary pivot axis, thereby operatively moving the latch pawl means toward the latch plate, so as to cause controlled reduction in the amount of backlash between the latch pawl means and the latch plate.

In another alternative embodiment (not illustrated), it is contemplated that the latch pawl means is slidably mounted on the first hinge plate, and the position of the latch pawl means is movable relative to the first hinge arm upon rotational adjustment of the eccentrically operative rotatably adjustable backlash reduction means.

I claim:

1. A selectively latchable vehicle seat hinge assembly comprising:

a first hinge arm and a first hinge plate each pivotally mounted about a common pivot axis for relative pivotal movement with respect to each other in first and second angular directions;

a stop means mounted on the first hinge plate in interfering relation with said first hinge arm so as to limit said relative pivotal movement of said first hinge arm and said first hinge plate in said first angular direction;

a latch plate mounted on the first hinge plate;

a latch pawl means pivotally mounted on said first hinge arm by means of an eccentrically operative, rotatably adjustable, backlash reduction means for pivotal movement about a separate pivot axis distinct from said common pivot axis and for selective latching contact with said latch plate so as to limit said relative pivotal movement of said first hinge arm and said first hinge plate in said second angular direction;

said backlash reduction means being mounted on said first hinge arm for rotation about a first pivot axis off-set and distinct from said common pivot axis to an optimized position, at which optimized position said backlash reduction means interacts with said latch pawl means to move said separate pivot axis and said latch pawl means generally toward said latch plate, thereby to cause controlled reduction in the amount of backlash between said latch pawl means and said latch plate; and, operating means interfacing with said latch pawl means so as to provide for said selective latching contact.

2. A vehicle seat hinge assembly according to claim 1, wherein said rotation of said eccentrically operative, rotatably adjustable backlash reduction means during assembly further causes controlled reduction in the amount of backlash between said latch plate and said stop means.

3. A vehicle seat hinge assembly according to claim 2, further comprising a second hinge plate, wherein said first and second hinge plates are rigidly fixed to each other in spaced apart generally parallel relation.

4. A vehicle seat hinge assembly according to claim 3, further comprising a second hinge arm, wherein said first and second hinge arms are rigidly fixed to each other in spaced generally parallel relation, said first and second hinge arms being adapted for the mounting of said latch pawl means and said operating means thereon in interposed relation therebetween.

5. A vehicle seat hinge assembly according to claim 4, wherein said latch plate is mounted in interposed relation between said first and second hinge plates about said common pivot for relative pivotal movement with respect to said first hinge arm and said first hinge plate in first and second angular directions, wherein said latch plate and said first and second hinge plates essentially form an articulated hinge plate structure.

6. A vehicle seat hinge assembly according to claim 5, further comprising a spring means operatively mounted between said operating means and at least one of said first hinge arm and said second hinge arm, thereby to cause said latch pawl means to be biased toward said selective latching contact with said latch plate.

7. A vehicle seat hinge assembly according to claim 6, wherein said operating means that interfaces with said latch pawl means is a manually operable lever.

8. A vehicle seat hinge assembly according to claim 7, wherein said manually operable lever is rotatably mounted on said first and second hinge arms separately from said latch pawl means.

9. A vehicle seat hinge assembly according to claim 8, wherein said eccentrically operative, rotatably adjustable backlash reduction means comprises a pin with an eccentrically displaced hub thereon.

* * * * *